Oct. 19, 1926.

J. R. TACKETT

BRICK SIZER

Filed May 21, 1926

WITNESS:
Rob. R. Kitchel.

INVENTOR
James R. Tackett.
BY
Augustus B. Stoughton.
ATTORNEY.

Oct. 19, 1926.
J. R. TACKETT
1,604,107
BRICK SIZER
Filed May 21, 1926
3 Sheets-Sheet 2
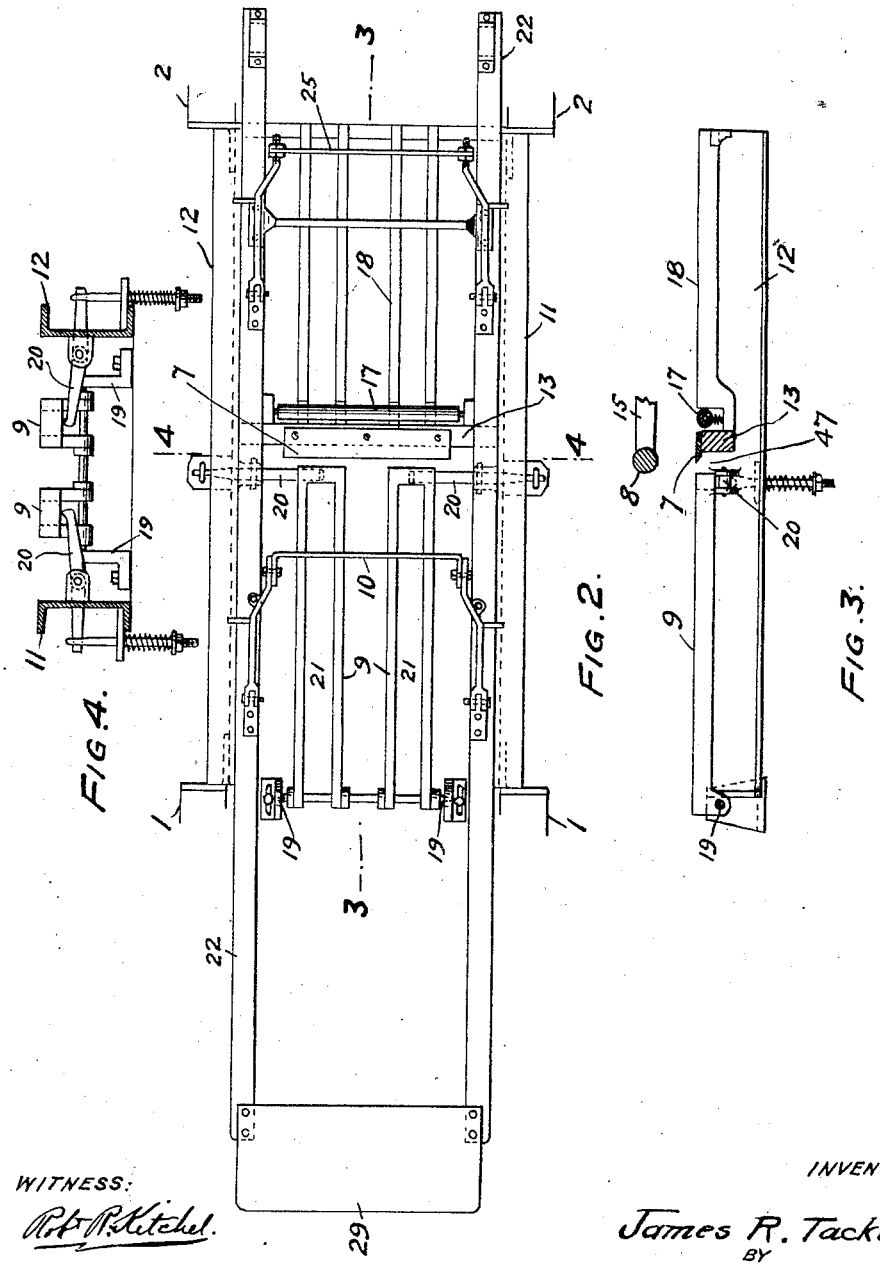
WITNESS:
INVENTOR
James R. Tackett
BY
ATTORNEY.

Oct. 19, 1926. 1,604,107
J. R. TACKETT
BRICK SIZER
Filed May 21, 1926 3 Sheets-Sheet 3

WITNESS:
Rob R Mitchel

INVENTOR
James R. Tackett
BY
Augustus B. S. Houghton
ATTORNEY.

Patented Oct. 19, 1926.

1,604,107

UNITED STATES PATENT OFFICE.

JAMES R. TACKETT, OF OLIVE HILL, KENTUCKY, ASSIGNOR TO GENERAL REFRACTORIES COMPANY, OF PHILADELPHIA, PENNSYLVANIA, A CORPORATION OF PENNSYLVANIA.

BRICK SIZER.

Application filed May 21, 1926. Serial No. 110,603.

The present invention relates to a brick sizer consisting of a press, a trimming mechanism through which bricks delivered from the press are passed, and a re-press to which trimmed bricks from the trimming mechanism are fed, and the principal objects of the present invention are to provide an improved trimming mechanism from which chips may freely fall and which accurately sizes the bricks, and to provide a simplified brick sizer of efficient operation. Other objects of the invention will appear from the following description.

The present invention may be said to consist of a brick sizer comprising a press and a re-press, a blade and a superposed roller interposed between the two presses and arranged with space between the blade and roller corresponding to the thickness of a trimmed brick, a tilting table having its free end disposed at the entrance to the space between the blade and roller and adapted to be depressed by an untrimmed brick passing off the table and under the roller, thereby presenting the excess thickness of the brick below the blade, and conveyer means including a pusher for feeding bricks delivered from the press along said table and through said space to trim them and for delivering the trimmed bricks to the re-press.

The invention also comprises the improvements to be presently described and finally claimed.

In the following description reference will be made to the accompanying drawings forming part hereof and in which there is illustrated a brick sizer embodying features of the invention and in which—

Fig. 2 is a top or plan view with parts omitted.

Fig. 3 is a sectional view on the line 3—3 of Fig. 2 with parts omitted.

Fig. 4 is a sectional view on the line 4—4 of Fig. 2.

Figure 1:
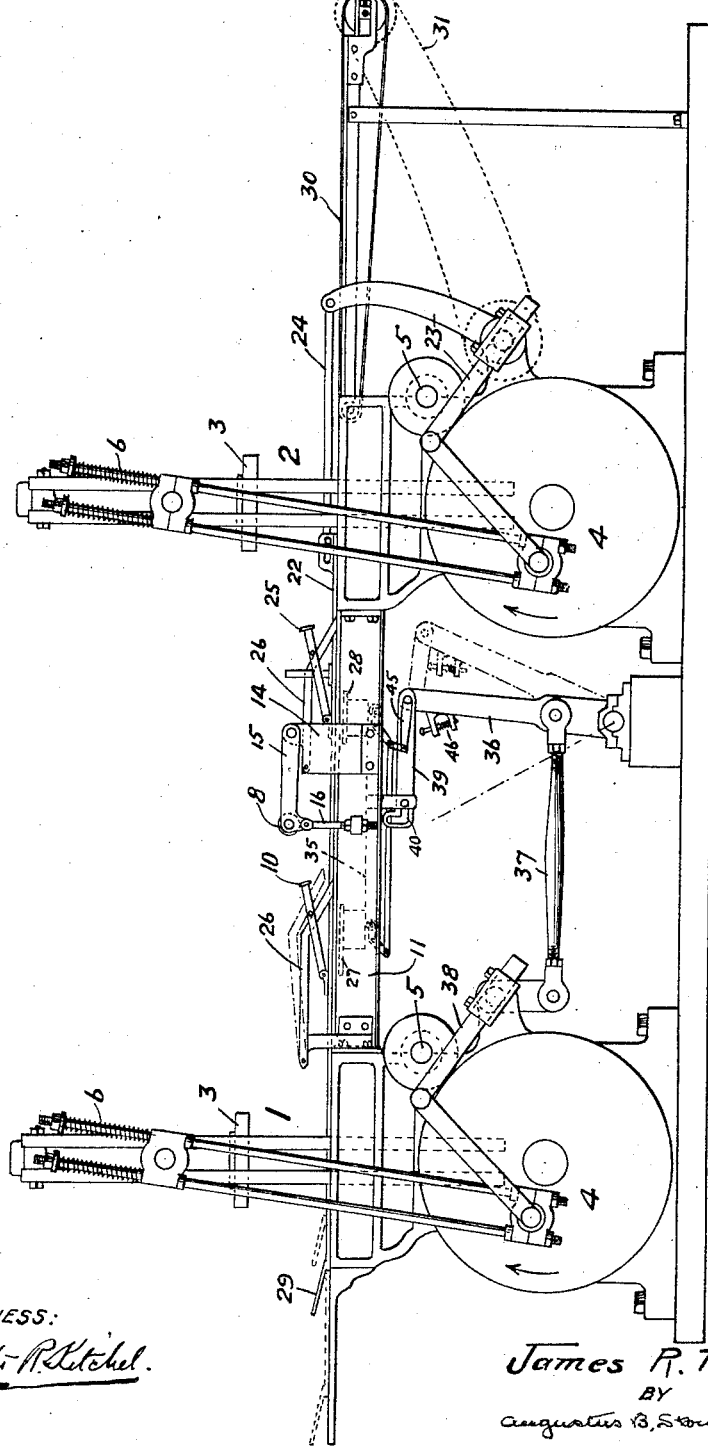
Figure 1 is a side elevational view of a brick sizer constituting one embodiment of the invention.

In the drawings 1, generally, is a press and 2, generally, is a re-press. These are well understood pieces of commercial apparatus. However, it may be said that each comprises a plunger 3 adapted to enter a mold and reciprocated by the crank mechanism 4 driven from drive shaft 5 and including safety springs 6. However, the pieces of machinery designated press and re-press are well known in many forms to those skilled in the art. 7 is a blade, concealed in Fig. 1 but shown in Figs. 2 and 3, and 8, Fig. 1, is a superposed roller, and the blade and roller are interposed between the two presses 1 and 2 and are arranged with space between the blade and roller corresponding to the thickness of a trimmed brick. 9, Fig. 3, is a tilting table having its free end disposed at the entrance to the space between the blades 7 and roller 8 and adapted to be depressed by an untrimmed brick passing off the free end of the table 9 and under the roller 8 thereby presenting the excess thickness of the brick below the blade so that chips may fall by gravity. There are conveyer means including a pusher 10 for feeding bricks delivered from the press 1 along the tilting table 9 and through the space between the blade 7 and the roller or hold-down guide 8 to trim them and for delivering the trimmed bricks to the re-press 2. Interposed between the housings of the presses 1 and 2 there is a fixed frame consisting of side pieces or channel sections 11 and 12, and a cross piece 13 which carries the blade 7.

Figure 5:
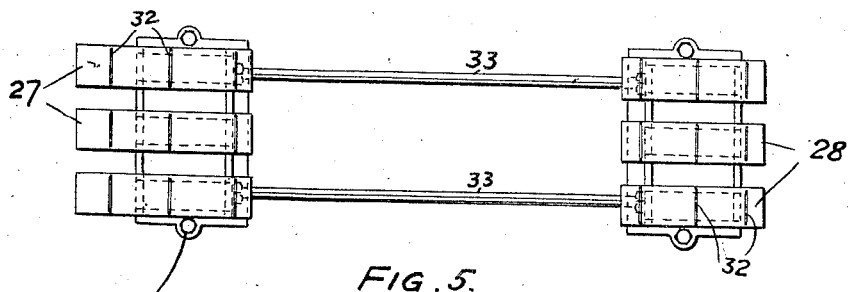
Fig. 5 is a top or plan detached view of a part of the conveyer means.
Figure 6:
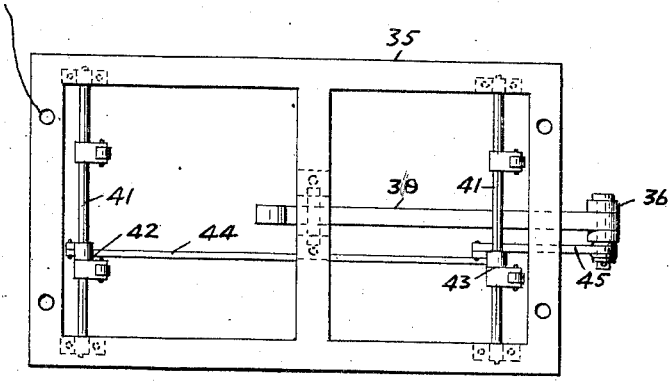
Fig. 6 is a similar view of another part of the conveyer means.
Figure 7:
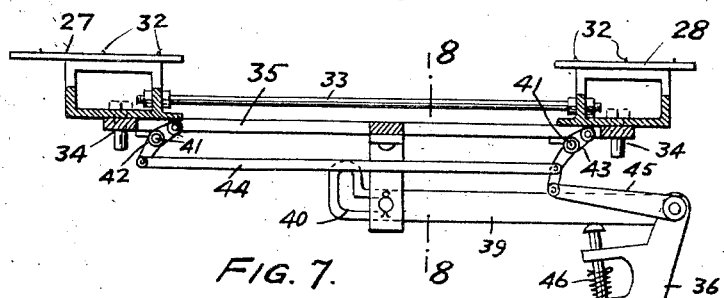
Fig. 7 is an elevational view partly in section illustrating the assembly of the parts shown separately in Figs. 5 and 6.
Figure 8:
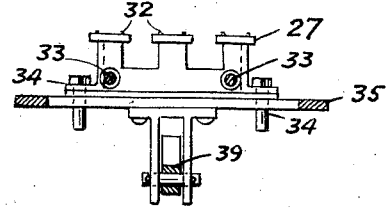
Fig. 8 is a transverse sectional view taken on the line 8—8 of Fig. 7.

Carried by the side pieces 11 and 12 are brackets 14, Fig. 1, to which are pivoted arms 15 that carry the roller or hold-down guide 8. 16 are adjusting screws by means of which the distance of the roller 8 above the blade 7 can be increased or diminished to increase or diminish the extent to which bricks are trimmed. There is also carried by the fixed frame an oil roller 17 and a fixed slotted table 18. The tilting table 9 is pivoted as at 19 to a fixed portion of the frame or machine, and its free or tilting end is normally positioned in general alignment with the blade 7 by means of centrally pivoted spring pressed levers 20 carried by the side pieces 11 and 12. The tilting table 9 is slotted as at 21. Slidable in respect to the fixed frame is a charger 22 and it is reciprocated by the crank motion mechanism 23 of the press 2 through the intervention of a link 24. Pivoted to the charger 22 is the pusher 10 and also the pusher 25, so that these pushers while incapable of turning movement are reciprocated in the direction of the presses. 26 are switches pivotally connected with the fixed frame so that when the charger is moving toward the left in Fig. 1, the pushers ride up into lifted position and then drop back into substantial parallelism with the tilting table 9 and the fixed table 18, and in that position they travel toward the right in Fig. 1 under and past the switches. The purpose is to get the pushers back of the ends of the bricks traveling from left to right in Fig. 1 in order that the pushers may push the bricks in the direction of from the press 1 to the press 2. The bricks are carried forward under the pushers when the latter are lifted by the switches through the intervention of carriers 27 and 28, Figs. 5 and 7, that work in the slots 21 and 18, Fig. 2, with a motion of horizontal reciprocation and at the ends of the horizontal strokes with a motion of vertical reciprocation so that the feeder 29 of the charger pushes the bricks into the press 1 and these oncoming bricks push bricks delivered from the mold of the press 1 into such position that carriers 27 receive them, lift them above the table 9, and carry them under the pusher 10, while lifted on its switch 26, and redeposit them on the table 9 in front of the pusher 10 which pushes them past the knife 7 as has been described over the oil roller 17 and into range of the carrier 28 which puts the trimmed bricks in front of the pusher 25 in the manner already described so that the pusher 25 feeds them to the press 2 where the oncoming bricks push the trimmed and repressed and therefore sized bricks to the off bearing belt 30 driven by the gearing 31. The carriers 27 and 28, Fig. 7, are shown as provided with spurs 32 and they are connected together by rods 33, so that they may be referred to collectively as carriers. The carriers have loose dowel pin connection 34 with a sliding frame 35 slidable in respect to the fixed frame 11, 12 and 13. The slidable frame 35 is reciprocated by a rocker arm 36 rocked by a link 37 through a crank motion mechanism 38 driven from the driving mechanism of the press 1. The rocker arm 36 is connected by a link 39 through a slot-and-pin connection 40 with the sliding frame 35. There are rock shafts 41 carried by the sliding frame 35 and they are provided with centrally attached arms 42 and 43 of which one of the ends work under the carriers 27 and 28, and of which the other ends are connected by a link 44, and the end of 43 is extended and connected by a link 45 with the rocker arm 36, thus movements of the rocker arm 36 oscillate rock shafts 41 and arms 42 and 43 of which the upper ends shown as fitted with rollers operate to raise and lower the carriers 27 and 28, for which purpose they are afforded freedom of motion by the dowel pins 34. The spring pushed pin 46 operates upon the link 39 and guides the slot-and-pin connection 40.

The operation may be described as follows:

The bricks fed to the press 1 are pressed in the mold of the press 1 and are delivered from the box or mold of the press 1, preferably a little thicker than are the finished sized bricks. By the described operation of the carriers 27 and pusher 10, the bricks are pushed along the tilting table 9 in succession and spaced apart one after another until they run under the roller or guide 8 with the result that the table 9 is tilted down sufficiently to present the front end of the brick to the knife or blade 7 with the portion of the brick above the knife 7 and below the roller 8 of the required height, the surplus height being below the blade 7, so that as the brick is fed toward the re-press the surplus is cut off from the under face of the brick and the chips fall through the opening 47 provided for that purpose. The bricks having been trimmed to the right thickness by the removal of surplus material from their under faces are fed into the mold box of the re-press 2 which of course is slightly larger than the mold box of the press 1 and in the mold box of the press 2 the bricks are finished and emerge all of uniform size.

Of course the press and re-press may be adapted to work upon one or more bricks at each operation. In the present instance they work upon more than one brick at a time and therefore there are more than one carrier 27 and 28, but the number is not important.

It may be remarked that the tension on the springs 6 of the re-press may exceed the tension on the springs 6 of the press, because the bricks acted upon by the re-press, having been pressed in the press 1 and trimmed, are of the same volume.

It will be obvious to those skilled in the art to which the invention relates that modifications may be made in details of construction and arrangement and in matters of mere form without departing from the spirit of the invention, which is not limited to such matters or otherwise than the prior art and the appended claims may require.

I claim:

1. A brick sizer comprising a press and a re-press, a blade and a superposed roller interposed between the two presses and arranged with space between the blade and roller corresponding to the thickness of a trimmed brick, a tilting table having its free end disposed at the entrance to the space between the blade and roller and adapted to be depressed by an untrimmed brick passing off the table and under the roller thereby presenting the excess thickness of the brick below the blade, and means for feeding bricks delivered from the press along the tilting table and under the roller and over the knife and to the re-press.

2. A brick sizer comprising a press and a re-press, a blade and a superposed roller interposed between the two presses and arranged with space between the blade and roller corresponding to the thickness of a trimmed brick, a tilting table having its free end disposed at the entrance to the space between the blade and roller and adapted to be depressed by an untrimmed brick passing off the table and under the roller thereby presenting the excess thickness of the brick below the blade, and conveyer means including a pusher for feeding bricks delivered from the press along said table and through said space to trim them and for delivering the trimmed bricks to the repress.

3. In a brick sizer a press and a re-press, a fixed frame interposed between the presses and provided with a blade, a spring pressed tilting table arranged in front and clear of the blade, an adjustable down guide arranged above the free end of the table and the blade, and a brick conveyer.

4. In a brick sizer a press and a re-press, a fixed table and a tilting table with an opening between for the passage of chips, and a blade and an oil roller carried by the fixed table, a roller above the free end of the tilting table, and a brick conveyer.

5. In a brick sizer a press and a re-press, a fixed blade and a tilting table in confronting spaced relation to provide an opening through which chips drop, a guide above the table and blade and under which bricks pass, and a brick conveyer.

JAMES R. TACKETT.